(12) United States Patent
Barsness et al.

(10) Patent No.: US 6,965,990 B2
(45) Date of Patent: Nov. 15, 2005

(54) METHOD AND APPARATUS FOR PROVIDING PROGRAMMING ASSISTANCE

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 10/003,395

(22) Filed: Oct. 23, 2001

(65) Prior Publication Data

US 2003/0079199 A1 Apr. 24, 2003

(51) Int. Cl.[7] .............................................. G06F 9/45
(52) U.S. Cl. ..................... 713/1; 717/109; 717/110; 717/113; 717/136; 235/375
(58) Field of Search ........................... 713/1; 717/110, 717/109, 113, 136; 235/375

(56) References Cited

U.S. PATENT DOCUMENTS

| | | | |
|---|---|---|---|
| 6,256,772 B1 * | 7/2001 | Apte et al. ................... | 717/100 |
| 6,314,559 B1 * | 11/2001 | Sollich ........................ | 717/111 |
| 6,609,246 B1 * | 8/2003 | Guhr et al. .................. | 717/103 |
| 6,665,688 B1 * | 12/2003 | Callahan et al. ............. | 707/200 |
| 6,792,595 B1 * | 9/2004 | Storistenau et al. ......... | 717/110 |
| 6,799,718 B2 * | 10/2004 | Chan et al. .................. | 235/375 |

* cited by examiner

*Primary Examiner*—A. Elamin
(74) *Attorney, Agent, or Firm*—Moser, Patterson & Sheridan, LLP

(57) ABSTRACT

Embodiments provide a method, article of manufacture, and apparatus for providing programming assistance in integrated development environments. In one embodiment, a list of internal and/or external variables associated with a particular method is generated. In another embodiment, a list of internal and/or external variables is ranked in order of probability for usage within a selected method call.

18 Claims, 16 Drawing Sheets

METHOD LIST DATA STRUCTURE          200
  METHOD DEFINITION

| |  |
|---|---|
| Example2.method2_2(int) | —212 |
| Example2.method2_2(String) | —214 |
| Example2.method2_2(char) | —216 |
| Example1.method2_2(char) | —218 |
| Example1.method2_2(long, String) | —220 |
| ⋮ | —222 |

*Fig. 2*

VARIABLE TYPE LIST DATA STRUCTURE   300
  TYPE

| | |
|---|---|
| int | —312 |
| String | —314 |
| char | —316 |
| long | —318 |
| ⋮ | —320 |

*Fig. 3*

VARIABLE LIST DATA STRUCTURE     *400*
(AFTER INTERNAL VARIABLES)
  VARIABLES

| |  |
|---|---|
| int i | 412 |
| String s3 | 414 |
| String this.s2 | 416 |
| String Example3.s1 | 418 |
| ⋮ | 420 |

*Fig. 4*

LIST OF CLASSES     *500*
  CLASS NAME

| | |
|---|---|
| java.lang.String | 512 |
| java.lang.Interger | 514 |
| ⋮ | 516 |
| Example1 | 518 |
| Example2 | 520 |
| Example3 | 522 |
| ⋮ | 524 |

*Fig. 5*

VARIABLE LIST DATA STRUCTURE  600
(AFTER EXTERNAL VARIABLES)
VARIABLE

| |  |
|---|---|
| int i | 612 |
| String s3 | 614 |
| String this.s2 | 616 |
| String Example3.s1 | 618 |
| String Example2.s1 | 620 |
| ⋮ | 622 |

Fig. 6

WEIGHTING DATA STRUCTURE  700

| ATTRIBUTE — 702 | WEIGHT — 704 | |
|---|---|---|
| MOST RECENTLY CREATED/MODIFIED | +30 | 712 |
| LOCAL VARIABLE | +10 | 714 |
| FROM CLASS HEIRARCHY | +5 | 716 |
| EXTERNAL VARIABLE | -5 | 718 |
| USED PREVIOUSLY | -10 | 720 |
| INITIALIZED | -20 | 722 |
| ⋮ | ⋮ | 724 |

Fig. 7

VARIABLE LIST DATA STRUCTURE
(AFTER RANKING)                    800

| VARIABLE | 802 | 804 |
|---|---|---|
| int i | 2 | 812 |
| String s3 | 45 | 814 |
| String this.s2 | 22 | 816 |
| String Example3.s1 | 10 | 818 |
| String Example2.s1 | 0 | 820 |
| ⋮ | ⋮ | |

| VARIABLE 902 | RANKING 904 | |
|---|---|---|
| Sting S3 | 90% | 914 |
| int i | 90% | 916 |
| String this.s2 | 45% | 918 |
| String Example3.s1 | 20% | 920 |
| String <new> | 5% | 921 |
| int # | 5% | 922 |
| Char "c" | 5% | 924 |
| long # | 5% | 926 |
| String Example2.s1 | 1% | 928 |

*Fig. 9*

```
public String getLibraryName(String line) {
    int size = line.length()
    String temp = null;
    if (size >= 10)
        temp = line.substring(0,10)
    else
        return null;
    String fileName = this.

return (fileName);
}
```
— 10A
— 1001A
— 1002A

```
begin(void) void
format (String) String
getSystemName(String) String
init(void) void
```

Fig. 10A

```
public String getLibraryName(String line) { int size = line.length()
    String temp = null;
    if (size >= 10)
        temp = line.substring(0, 10)
    else
        return null;
    String fileName = this.format( ()

return (fileName);

}
```
— 10B
— 1001B
— 1002B

```
String fileName
String line
String temp
String <new>
```

```
public class Example1 {
   public void method2_2(char c) {
      return;
   }
   public void method2_2(long l, String s) { // overloaded method
      return;
   }
}
public class Example2 extends Example1 { public static String s1 = "hello"; // class variable
   public String s2 = "there"; // instance variable
   public String s3 = "don't touch"; // variable inaccessable externally public static void method2_1() {// class method
      return;
   }
   public static void method2_2(int i){ // instance method
      String s= "jump"; // local variable, instance of the String class
      Example2.method2_1(); // calling a class method on a class object
      s.length(); // calling an instance method
   }
   public void method2_2(String s){ // overloaded method
      return;
   }
```

```
    public void method2_2(char c){ // overloaded and overriden method
        return;
    }
}
    public class Example3 {
    private static Strig s1 = "class";
    private String s2 = "instance"
    public void method3_1(int i) {
        String s3 = "local";

Example2 ex2 = new Example2();
        ex2.method2_2(|}— 1001C
```

| | | |
|---|---|---|
| 90% | String s3 | |
| 90% | int i | |
| 45% | String this.s2 | ← 1002C |
| 20% | String Example3.s1 | |
| 5% | String <new> | |
| 5% | int # | |
| 5% | char 'c' | |
| 5% | long # | |
| 1% | String Example2.s1 | |

*Fig. 11B*

METHOD AND APPARATUS FOR PROVIDING PROGRAMMING ASSISTANCE

BACKGROUND OF THE INVENTION

1. Field of the Invention

Embodiments of the invention generally relate to integrated development environments. More particularly, the invention relates to providing programming assistance in integrated development environments.

2. Background of the Related Art

In an Integrated Development Environment (IDE), computer users and programmers use a program editor to write computer programs and develop software applications in the form of source code. The source code is conventionally written in a high-level programming language, e.g., C++, Java, Pascal, and the like. To run such computer programs in a computer system, a compiler program must convert the source code into executable code or object code.

IDE environments like VisualAge from International Business Machines (or even some code editors) have the ability to prompt the user with various methods or procedures that can be called from a given object. For example, in VisualAge™ for Java™ after typing the name of a Java class (e.g., String) or a variable representing that class, the user can hit "Ctrl-Space" on a personal computer and a list of methods callable for the String class will appear. The user can then select the method they want to invoke, and the IDE updates the program source with the selected method call. This prompting saves not only keystrokes, but also is one of the fundamental reasons that make IDE environments more useful than using basic editors.

Unfortunately, method calls for the most part have a number of potential parameter lists and the amount of variables available to pass to a method may be numerous, creating a difficult task for the programmer to keep track of the method and variable associations. As a result, while programming, the programmer often has to keep notes on what internal and/or external variables to use for each method call, slowing software development and consequently increasing the software development cost.

Therefore, there is a need for a prompting method and apparatus to efficiently display programming assistance information within integrated development environments.

SUMMARY OF THE INVENTION

Embodiments of the invention provide a method, article of manufacture, and apparatus for providing programming assistance, i.e., prompting. In one embodiment, the invention provides a method of providing programming assistance for an integrated development environment where the method comprises receiving a selection of a method call from a list of method calls, and providing a list of variables associated with and available to be passed to the method call.

In another embodiment, the invention provides a computer-readable medium comprising a programming assistance tool, wherein the programming assistance tool, when executed by a processor performs an operation comprising receiving a selection of a method call from a list of method calls, and providing a list of variables associated with and available to be passed to the method call.

In another embodiment, the invention provides a processing system, comprising a memory that includes a database comprising a programming assistance tool, a list of method calls, a list of variables available to pass to at least one method call from the list of method calls, and a processor. The processor which, when executing the programming assistance tool, is configured to perform an operation comprising receiving a selection of a method call from the list of method calls, and providing a list of variables associated with and available to be passed to the method call.

BRIEF DESCRIPTION OF THE DRAWINGS

A more particular description of aspects of the invention, briefly summarized above, may be had by reference to the embodiments thereof, which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 illustrates a data structure of available methods.

FIG. 3 illustrates a variable type data structure.

FIG. 4 illustrates an internal variables data structure.

FIG. 5 illustrates a data structure of classes to search for external variables.

FIG. 6 illustrates a data structure of external and internal variables.

FIG. 7 illustrates a data structure of weighting factors for external and internal variables.

FIG. 8 illustrates a data structure of weighted internal and/or external variables.

FIG. 9 illustrates a data structure of internal and/or external variables ranked in a hierarchy.

FIGS. 10A and 10B depict an output display for a method selection and associated variables to pass therein.

FIGS. 11A and 11B depict an output display for a method selection and associated ranked variables to pass therein.

DETAILED DESCRIPTION OF THE PREFERRED EMBODIMENTS

Embodiments of the invention provide a method, article of manufacture, and apparatus for providing programming assistance, i.e., prompting. As used herein "information" includes any data or values regardless of format, or length. For example, one type of information is a variable. A variable may be a single character (e.g., letter, numeral, symbol, etc.) or may be a string of characters (e.g., a phrase). As used herein "pre-defined association" means that a fixed/static association between methods, parameters, variables, objects, classes, and prompts exist. IDE environments as described herein generally contain associations between methods or procedures that can be called from an object. For example, the IDE environment may include Java classes or variables representing the classes and the callable methods to invoke on the class. The term internal refers generally to classes accessible within the IDE. While the term external generally refers to other classes outside the workspace but within the IDE, classes external to the IDE stored within different databases are contemplated. The term package generally refers to a collection of related classes and interfaces. Various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

As will be described below, aspects of one embodiment pertain to specific method steps implementable on computer systems. In one embodiment, the invention may be implemented as a computer program-product for use with a computer system. The programs defining the functions of at least one embodiment can be provided to a computer via a variety of computer-readable media (i.e., signal-bearing medium), which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the product program may be developed and implemented independently, but when combined together are embodiments of the invention.

Figure 1:
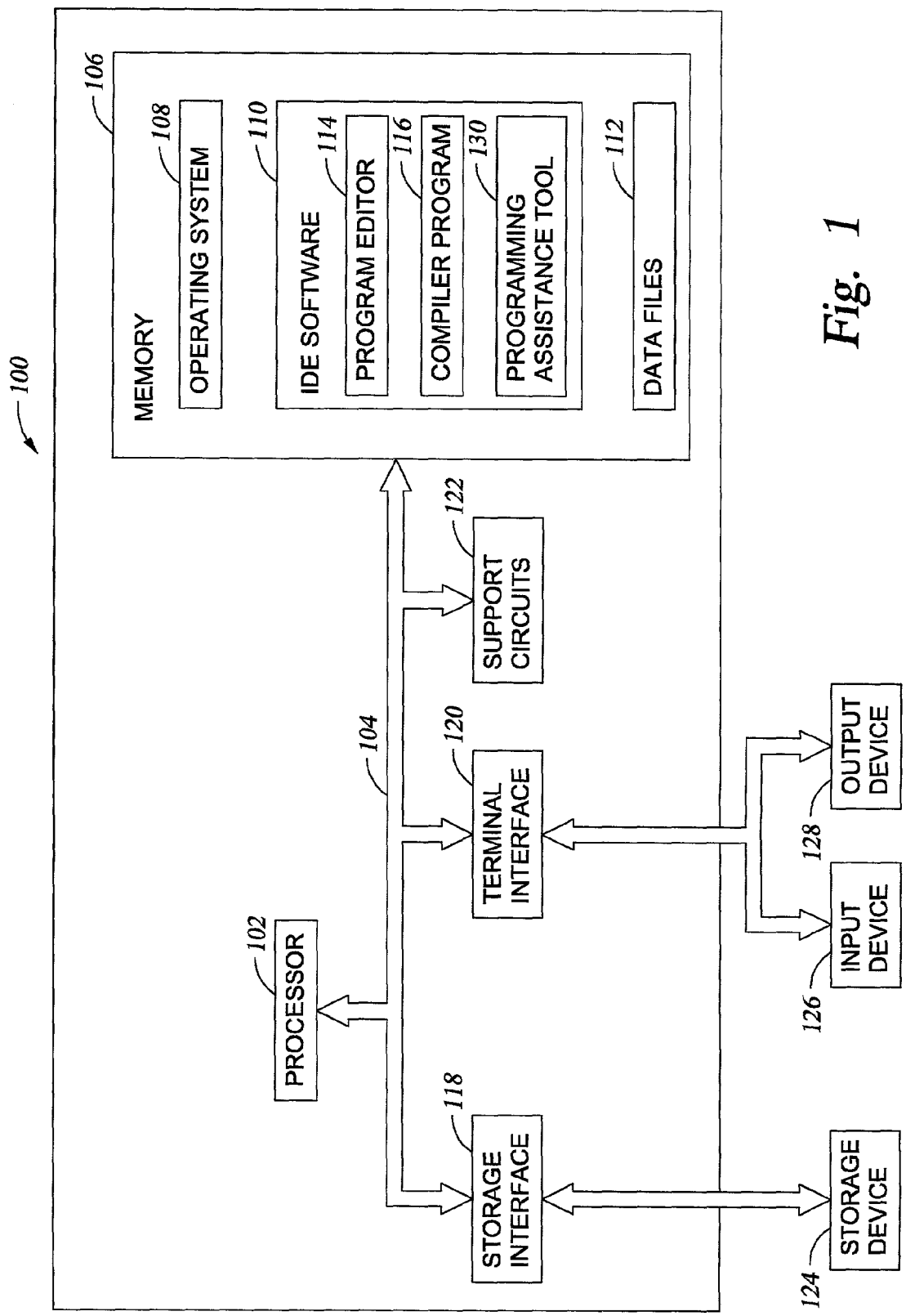
FIG. 1 illustrates a block diagram of a computer system utilized in the invention.

FIG. 1 depicts a computer system 100 illustratively utilized in accordance with the invention. The computer system 100 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 100 is an eServer iSeries 400 available from International Business Machines of Armonk, N.Y.

Illustratively, the computer system 100 comprises a standalone device. However, the computer system 100 may also comprise a device coupled to a computer network system. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer system 100 is shown comprising at least one processor 102, which obtains instructions and data from a main memory 106 via a bus 104. The computer system 100 is generally coupled to a number of peripheral devices. Illustratively, the computer system 100 is coupled to a storage device 124, input devices 126, and output devices 128. Each of the peripheral devices is operable coupled to the computer system via respective interfaces. For example, the computer system 100 is coupled to the storage device 124 via a storage interface 118, and is coupled to the input device 126 and the output device 128 via a terminal interface 120. The support circuits 122 include devices that support the operation of the computer system 100. Examples of support circuits 122 include a power supply, a clock, and the like.

The input device 126 can be any device adapted to give input to the computer system 100. For example, a keyboard, keypad, light-pen, touch-screen, track-ball, or speech recognition unit could be used. The output device 128 is preferably any conventional display screen (e.g., computer monitor). Although shown separately from the input device 125, the output device 130 and input device 125 could be combined. For example, a display screen with an integrated touch-screen, and a display with an integrated keyboard, or a speech recognition unit combined with a text speech converter could be used. The storage device 124 is preferably a direct access storage device (DASD), although it is shown as a single unit, it could be a combination of fixed and/or removable storage devices, such as fixed disc drives, floppy disc drives, tape drives, removable memory cards, or optical storage.

The main memory 106 may comprise one or a combination of memory devices, including Random Access Memory (i.e., RAM), nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104. While the main memory 106 is shown as a single entity, it should be understood that main memory 106 may in fact comprise a plurality of modules, and that the main memory 106 may exist at multiple levels, from high speed registers and caches to lower speed but larger DRAM chips. Further, the main memory 106 and storage device 124 could be part of one virtual address space spanning multiple primary and secondary storage devices.

The memory 106 is shown configured with an operating system 108. The operating system 108 is the software used for managing the operation of the computer system 100. Examples of the operating system 108 include IBM OS/400, UNIX, Microsoft Windows, and the like.

The memory 106 further includes Integrated Development Environment (IDE) software 110 which includes programming that enables a programmer to develop computer programs and software. In addition, the main memory 106 may contain various files 112 used with the IDE software 110. The files 112 include any file used or created while executing the IDE software 110. Examples of files 112 include source code, object code, bytecodes, output data, and the like. The source code comprises one or more programs or files 112 that may be written in a programming language such as C, C++, Pascal, Java, and the like. For purposes of illustration, embodiments of the invention will be described with reference to Java. However, the invention is not limited to a particular language.

In one embodiment, the IDE software 110 includes a program editor 114, a compiler program 116, and a programming assistance tool 130. The program editor 114 is a software application that enables a programmer to write and edit computer programs in the form of source code. In one embodiment, the editor 114 is adapted to display prompts received from the programming assistance tool 130 to aid the programmer, or user, in software development. The editor 114 may be of any type of editor adapted to output the source code and prompts to the output device 128 such as a computer monitor. In one embodiment, the programming assistance tool 130 is adapted to search both internal and/or external databases such as within memory 106 and external memories (not shown) to provide a listing of the available internal/external methods and variables callable from the methods to prompt to the user for selection and insertion into the source code. In one embodiment, the programming assistance tool 130 is integrated with the editor 114 so that when function keys such as "F1", etc. are used, the programming assistance tool 130 is activated. In another embodiment, the programming assistance tool 130, is activated when the user places a cursor in a particular location on a display screen. The compiler 116 is a software program that interprets and converts the source code into object code. The compiler 116 then compiles the source code into object code. The object code comprises one or more programs or files used by the operating system 108 or an application program (not shown).

In general, the routines executed to implement embodiments of the invention, whether implemented as part of an operating system or a specific application, component, program, object, module or sequence of instructions will be referred to herein as the IDE software 110, or software 110. The software 110 typically comprises one or more instructions that are resident at various times in various memory and storage devices in the computer system 100. When read and executed by one or more processors 102 in the computer system 100, the software 110 causes that computer system 100 to perform the steps necessary to execute steps or elements embodying the various aspects of the invention.

FIGS. 2–9 depict embodiments of data structures within the files 112 for storing data such as programming prompts in which aspects of the invention may be used to advantage. FIG. 1 is referenced within the following discussion of FIGS. 2–9 as necessary.

FIG. 2 illustrates one embodiment of a method data structure 200. A plurality of methods are stored within the method data structure 200. Each row 212–222 includes a callable method definition for use during software development. For example, the first row 212 contains a method definition "Example2.Method2_2(int)" where the variable type available to pass in is an integer. As illustrated, a plurality of methods may be used and each method may have an infinite number of variables both internal and external, which may be passed in.

FIG. 3 illustrates one embodiment of a variable type data structure 300. Each row 312–320 contains one variable type. As illustrated, a plurality of variable types such as integer, string, character, and the like, may be used. For example, the first row 312 contains an integer variable type, the second row 314 contains a string variable type, and so forth.

FIG. 4 illustrates one embodiment of an internal variable data structure 400. Each row 412–420 contains one internal variable. Internal means a subset of variables accessible to the programmer within the class the method is being invoked on or within the class hierarchy. As illustrated, a plurality of internal variables such as integer, String, character, and the like, may be used. For example, the first row 412 contains an internal integer variable "int i", the second row 414 contains an internal String variable "String s3", and so forth.

FIG. 5 illustrates one embodiment of a defined classes data structure 500 to search for variables to pass within a method. Each row 512–524 contains one class to search for variables. For example, row one 512 contains the class name "java.lang.String" and the second row 514 contains the class name javaj.lang.Integer", and so forth.

FIG. 6 illustrates one embodiment of a variable data structure 600. Each row 612–622 contains an internal or external variable. An external variable is defined herein as variables available to the programmer or user during software development external to class hierarchy of an object. As illustrated, a plurality of internal/external variables such as integer, String, character, and the like, may be used. For example, row one 612 contains the internal variable "int i". Row five 620 contains an external string variable "Examples.s1".

FIG. 7 illustrates one embodiment of a variable weighting data structure 700. Each row 712–724 contains a variable attribute and the weighting factor associated with the attribute. Illustratively, the variable weighting data structure 700 includes a variable attribute column 702 and a weight factor column 704. In one aspect, the attribute is given a weight value associated with the relevancy of the attribute to the user to facilitate ranking and/or sorting the variables during as described below with respect to FIGS. 12–17. The weighting factor may be an absolute or relative value with respect to another attribute. For example, the first row 712 contains a weighting factor of "+30" for variables which were most recently created or modified and the second row 714 contains a weighting factor of "+10". In this case, the first attribute within row 712, "most recently created/modified" has three times the weight as the "local variable" attribute within the second row 714. In one aspect, the weighting factor is used as ranking criteria to be used for ranking the variables in a hierarchical order as described below with respect to FIG. 8. It is contemplated that the weighting factor may be any value, numeral, symbol, and the like, and combinations thereof. In another embodiment, the weighting factor may be modified by the user. In still another embodiment, the weighting factor may be automatically adjusted based on the results of the ranking and the actual selection of the variables. Ranking is explained with reference to FIG. 8 described below.

FIG. 8 illustrates one embodiment of a ranked variable data structure 800. Each row 812–820 contains a variable and a ranking score based on the attributes associated with each variable, and their weight factor from the weighting data structure 700. Illustratively, the ranked variable data structure 800 includes a ranked variable column 802 and an associated weight column 804. For example, a first row 812 includes the variable "int i" having the associated weight factor of two from the associated weight column 804. The second row 814 includes the variable "String s3" having a weight factor of "forty-five" from the associated weight column 804. Accordingly, the "String s3" variable has a higher weight factor than the "int i" variable and therefore would be ranked higher.

FIG. 9 illustrates one embodiment of a sorted variable data structure 900. Illustratively, the sorted variable data structure 900 contains a variable column 902 and a percentage rank column 904 indicating a sorted hierarchy between the variables within the variable column 902. Accordingly, Each row 914–928 contains a variable and an associated percentage rank. In one embodiment, the order of the variables is defined as the greatest ranking in the first row 912 to the least ranking. For example, "String s3" and "int i" have a percentage rank of 90% and are listed first, whereas "String Example2.s1" has a percentage ranking of 1% and is ranked last. While the order of the ranking is shown as the highest percentage to the lowest percentage, it is contemplated that the ranking could be ordered in other ways such as alphabetically, or ordered using combinations of ordering methodologies to accommodate a user preference. For example, the list of variables may be ranked both by percentage and alphabetically, in which case the variable "int i" would be listed first and then "String s3".

FIGS. 10–11 depict a user interface 1000 for displaying various examples of programming assistance for methods on the output device 128, e.g., a display device. In one embodiment, the user interface 1000 may comprise a graphical user interface (GUI). In one aspect, the user interface 1000 is adapted to display the prompts derived from one or more of the data structures 200–900.

FIGS. 10A and 10B illustrate one example of a selected method defined as "getLibraryName(String line)" and the available variables to pass therein displayed by programming assistance tool 130. FIG. 10A illustrates a user interface 1000 indicating a sample portion of source code including a method "getLibraryName(String line)". Illustratively, when a period "." is inserted after the object "this" i.e., variable insertion point 1001A, preceding the object "this", a method call selection window 1002A is opened to display a list of possible method calls callable for the object "this". In one embodiment, the method calls available are sorted by the programming assistance tool 130. The method calls may be sorted in any order such as alphabetically, or in a hierarchical order. For example, programming assistance tool 130 may sort the method calls in order of usage with regard to the number of times the method call is used within the IDE environment. The method call usage may also be based on usage within a class, package, or project, and the like, and may be based on an individual user or the usage across a multi-user IDE environment.

FIG. 10B illustrates a method call selection "format( )" from method call selection window 1002A inserted by the programming assistance tool 130 after the object "this". In one embodiment, when the cursor is placed within the parenthesis, i.e., insertion point 1001B, a variable selection window 1002B is displayed. The variable selection window 1002B is adapted to display any available variables from the data structures 200–900. In this example, the variable selection window 1002B indicates that the variables "String temp", "String line", "String <new>" and "String fileName" are available to pass into the method call format on the object "this".

FIGS. 11A and 11B illustrate one example of a selected method defined as "ex2.method2_2" used within the class "Example3" method call and the available ranked variables to pass into the selected method therein. Illustratively, when the cursor is placed variable insertion point 1002C of "ex2,method2_2" the variable selection window 1002B is displayed by programming assistance tool 130. The variable selection window 1002C is adapted to display any ranked available variables from the data structure 900. In this example, the variable selection window 1002C indicates the ranked in order of likelihood that they will be needed for the method "ex2.method2_2". For example, the variable "String s3" is shown with a ranking of "90%" indicating a 90% probability that the variable "String s3" will be needed by the method "ex2.method2_2", whereas, the variable "String Example2.s1" is ranked at a 1% probability that it will be needed by the function "ex2.method2_2". In this example, a portion of the variables within selection window 1002B are derived using the programming assistance tool 130 from the source code (i.e., "Example3") within the IDE environment 106 and associated with "Example3". For example, the methods "void method2_2(int i)", and "void method3_1(int i)" contain the "int i" variable listed in the selection window 1004B.

It should be understood that the above embodiments are merely illustrative of a few of the many available variables and methods to be displayed and inserted into the source code. As such, the editor 114 may similarly provide the display of other types of variables on the user interface 1000. In other words, the editor 114 is not limited to the variables described with respect to FIGS. 10–11.

FIGS. 12–17 depict one embodiment of the execution of programming assistance tool 130 for providing programming assistance during code development, e.g., developing source code, for display on the user interface 1000. In one embodiment, programming assistance tool 130 is implemented as a tool or option in the program editor 114.

Figure 12:
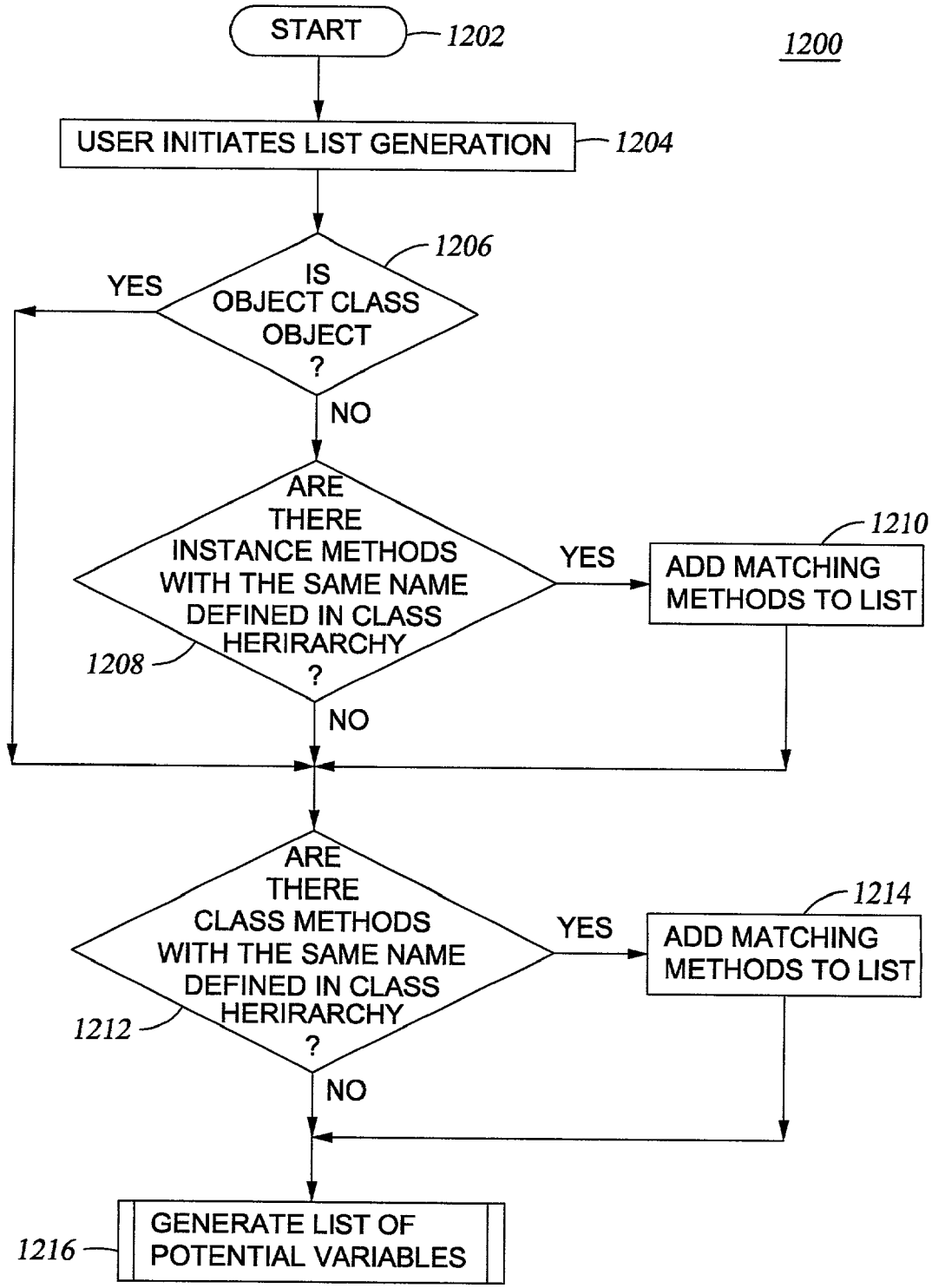
FIG. 12 is a flow diagram of a method of generating a method list.

FIG. 12 depicts one embodiment for a flow diagram of a process 1200 of the programming assistance tool 130 for generating the method data structure 200. Specifically, the process 1200 starts at step 1202 and proceeds to step 1204 where the programming assistance tool 130 is initiated to list variables that could be passed into a particular method called on a particular class instance, Class object, or the like. At step 1206, the process 1200 determines whether the method is being invoked on a Class object. If the method is being invoked on a Class object, then process 1200 proceeds to step 1212 described below. If the method is not being invoked on a Class object then the process 1200 proceeds to step 1208 to determine if there are instance methods that have the same name in the class hierarchy. If there are instance methods with the same name then the process 1200 proceeds to step 1210 to add the matching methods to the method data structure 200. If there are no instance methods with the same name then the process 1200 proceeds to step 1212. At step 1212, the process 1200 determines if there are class methods with the same name defined in the class hierarchy. If there are class methods with the same name defined in the class hierarchy then the process 1200 proceeds to step 1214 and adds the matching methods to the method data structure 200. If there are no class methods with the same name defined in the class hierarchy then the process 1200 proceeds to step 1216. At step 1216, the process 1200 generates a list of variables for the instance and class methods from the method data structure 200 as described below with reference to FIG. 13.

Figure 13:
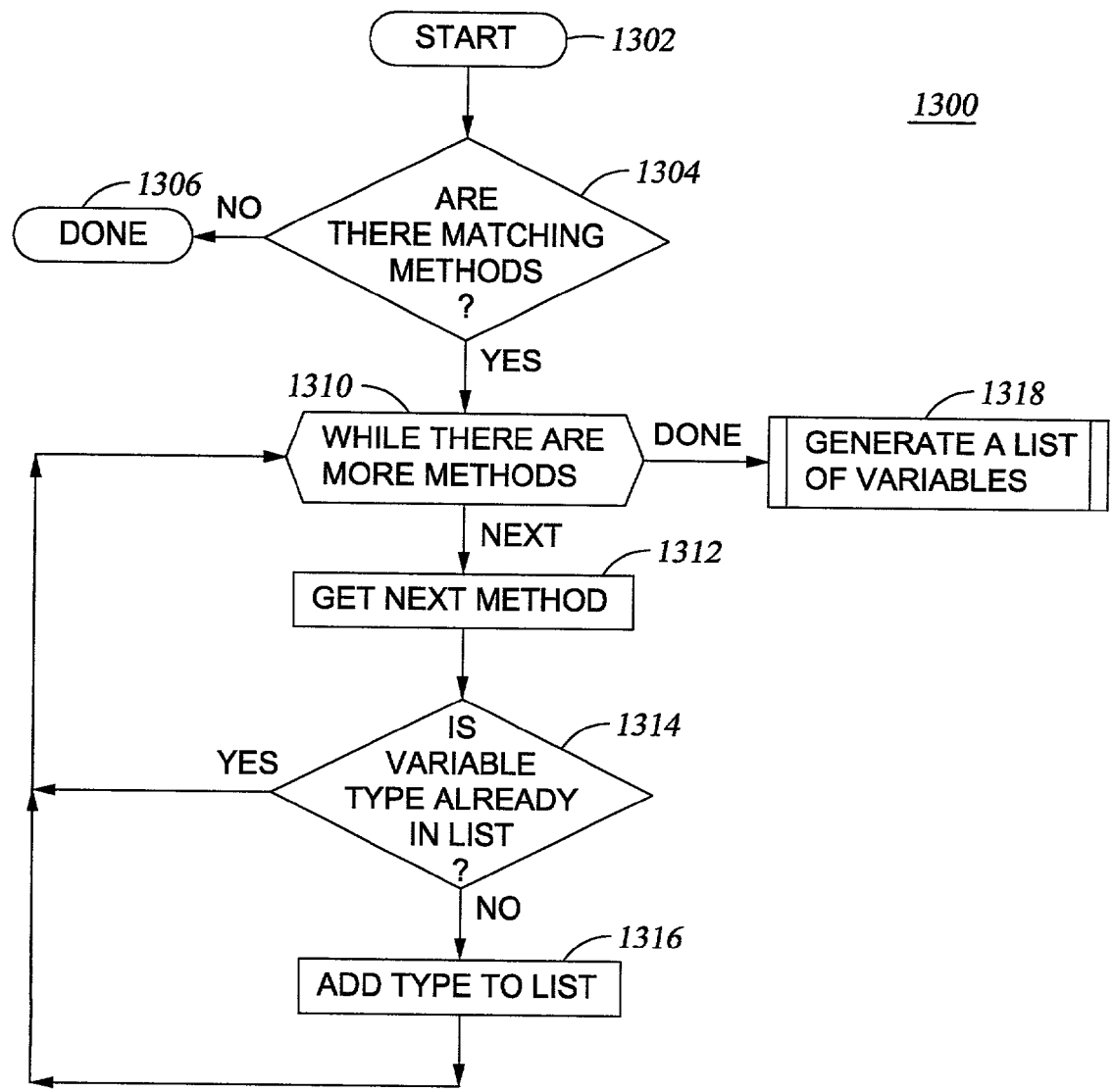
FIG. 13 is a flow diagram of a method of generating a list of variable types.

FIG. 13 depicts one embodiment for a flow diagram of a process 1300 of the programming assistance tool 130 for generating the available variable type data structure 300. The process 1300 is embodied as step 1216 described above with reference to FIG. 12. The process 1300 starts at step 1302 when process 1300 enters at step 1216. At step 1304, the process 1300 determines if there are matching methods from process 1200. If there are no matching methods then the process 1300 proceeds to step 1306 and exits. If there are matching methods then the process 1300 proceeds to step 1310.

At step 1310, each method from data structure is processed to determine the available variable types associated with each method from data structure 200. At step 1312, the process 1300 retrieves a method from method data structure 200. At step 1314, the process 1300 determines if the variable type associated with the method is listed within the variable type data structure 300. If the variable type is already listed, then the process 1300 proceeds to step 1310 to process the next method. At step 1314, if the variable type is not within variable type data structure 300, then the process 1300 proceeds to step 1316 to add the variable type to variable data type data structure 300. If all of the methods have been processed at step 1310 then the process 1300 proceeds to step 1318 to generate a list of variables associated with the variable types as described below with in FIG. 14.

Figure 14A:
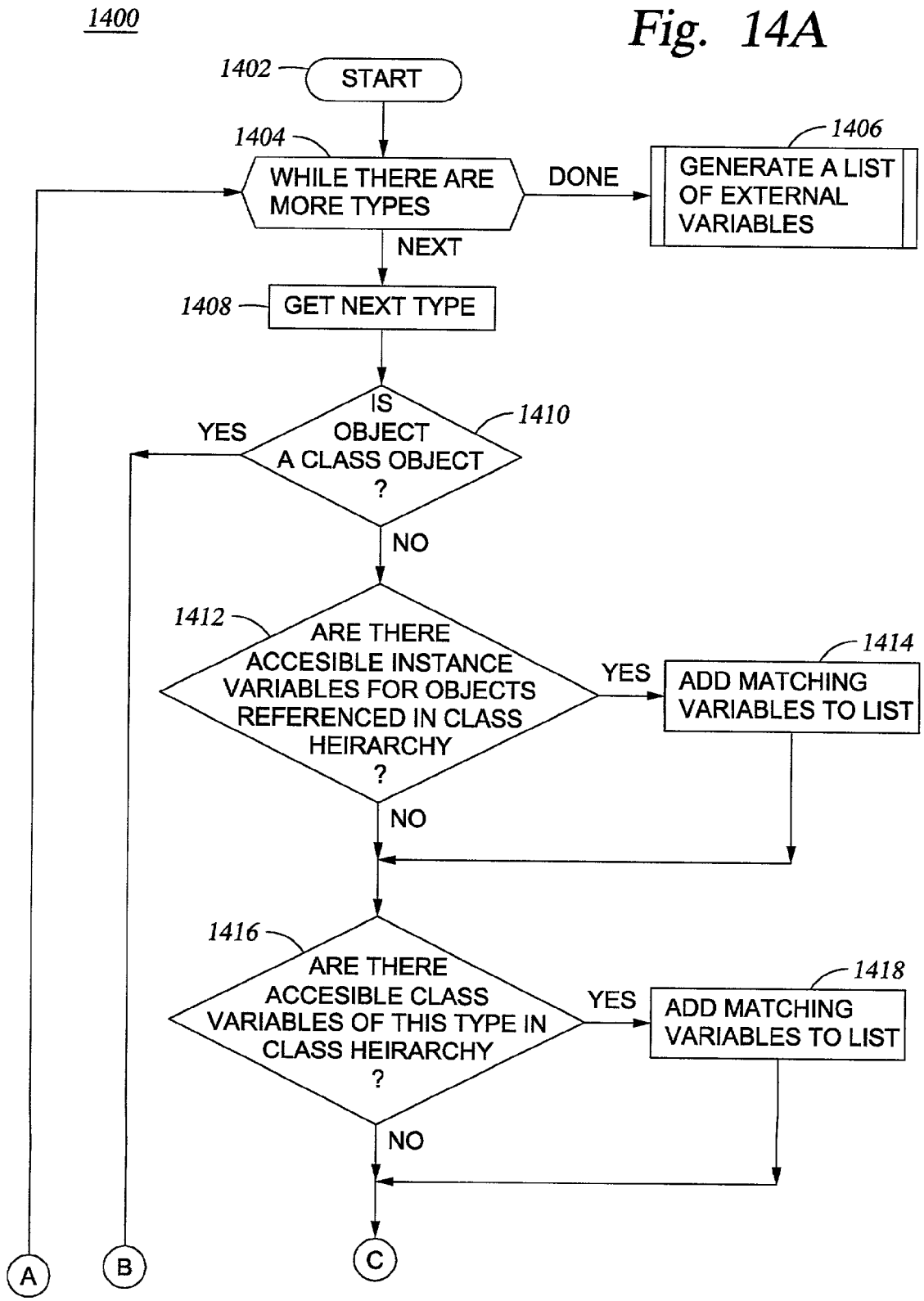
FIGS. 14A and 14B are a flow diagram of a method of generating an internal variable list.
Figure 14B:
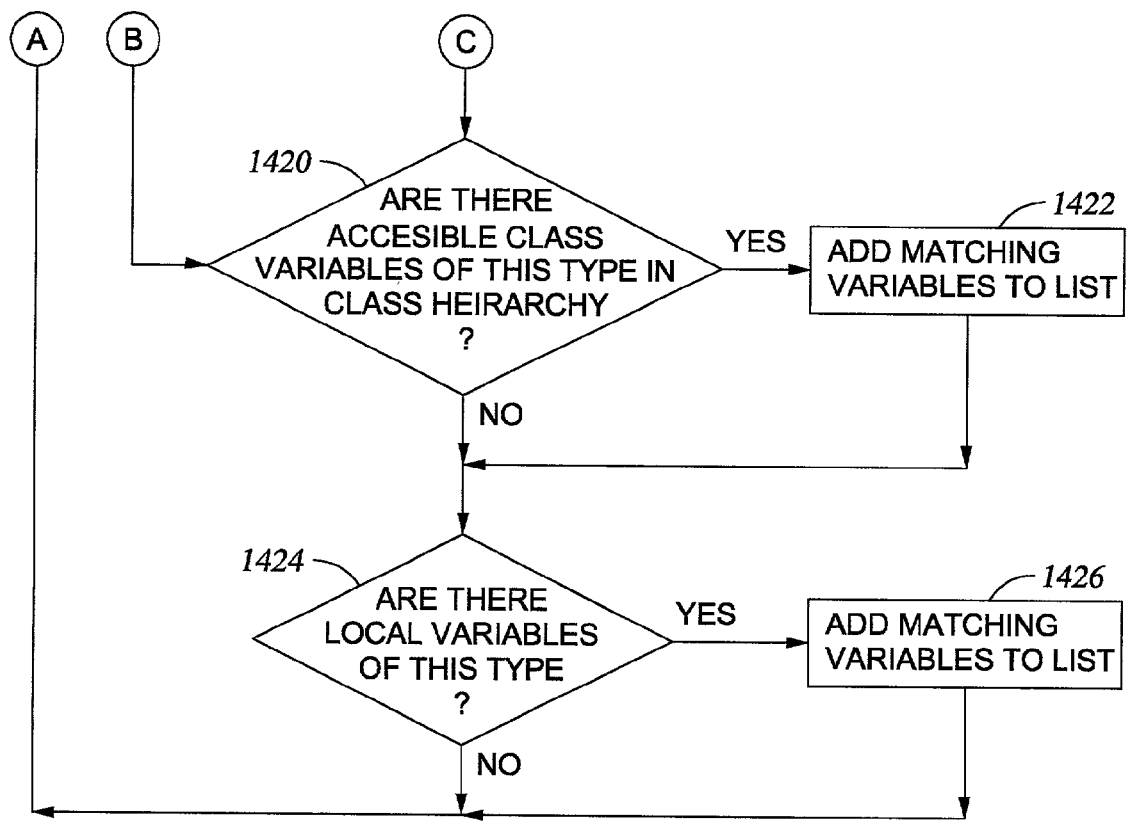

FIGS. 14A and 14B depict one embodiment for a flow diagram of a process 1400 of the programming assistance tool 130 for generating the available internal variables. The process 1400 is embodied as step 1318 described above with reference to FIG. 13.

The process 1400 starts at step 1402 when process 1400 is entered at step 1318. At step 1404, the process 1400 processes each variable type from the variable type data structure 300 to determine the available internal variables. At step 1408, the process 1400 selects a variable type from the variable type data structure 300. At step 1410, the process 1400 determines whether the object the method is a Class object. If the method is a Class object, then the process proceeds to step 1420 described below. If the object being selected by the user is not a Class object, then the process 1400 proceeds to step 1412. At step 1412, the process 1400 determines if there are variables matching the selected variable type in the class hierarchy. If there are variables within the class matching the selected variable type, then the process 1400 proceeds to step 1414 and adds the variables matching the query to the internal variable data structure 400. If no variables within the class match the selected variable type, then the process 1400 proceeds to step 1416. At step 1416, the process 1400 determines if there are accessible instance variables matching the selected variable type for objects referenced in the class hierarchy. If there are accessible instance variables matching the selected variable type for objects referenced in the class hierarchy, then the process 1400 proceeds to step 1422 and adds the variables matching the query to the internal variable data structure 400. If there are no accessible instance variables matching the selected variable type for objects referenced in the class hierarchy, then the process 1400 proceeds to step 1424.

At step 1424, the process 1300 determines if there are local variables of the selected variable type. If there are no local variables matching the query, then process 1400 proceeds to step 1404 to process the next variable type available. If there are local variables, then process 1400 proceeds to step 1426 to add the local variables matching the query to the internal variable data structure 400. If all of the variable types have been processed at step 1404, then the process 1400 proceeds to step 1406 to generate an list of external variables as described below with reference to FIG. 15.

Figure 15:
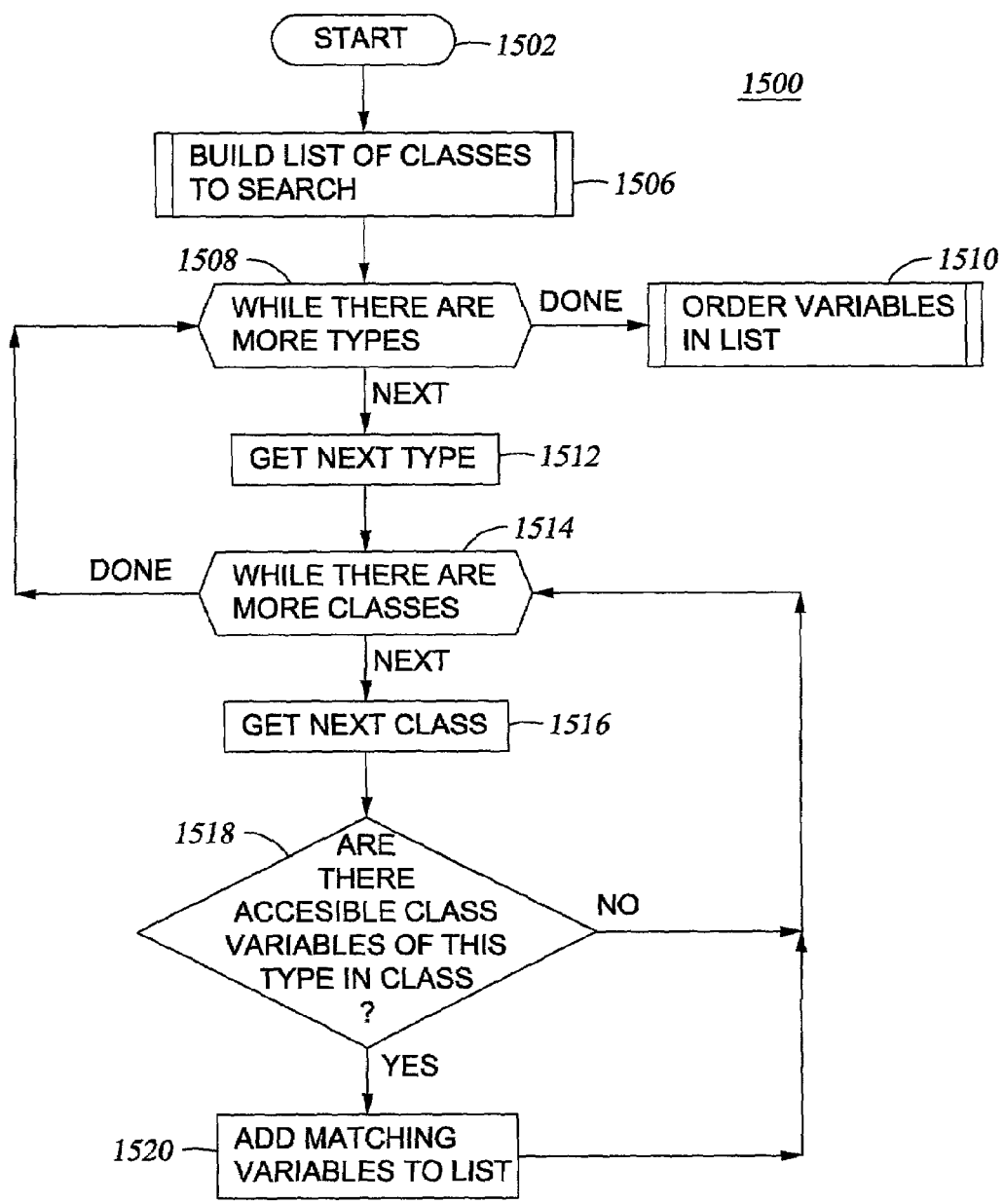
FIG. 15 is a flow diagram of a method of generating an external variable list.

FIG. 15 depicts one embodiment for a flow diagram of a process 1500 of the programming assistance tool 130 for generating available external variables from classes. The process 1500 is embodied as step 1406 described above with reference to FIG. 14. The process 1500 starts at step 1502 when process 1500 is entered at step 1406. At step 1506, the process 1500 builds a list of classes to search for external variables explained below with respect to FIG. 16. At step 1508, the process 1500 searches the list of classes to determine the external variables therein. At step 1512, the process 1500 selects a variable type from variable type data structure 300. At step 1514, the process 1500 searches each available class for the selected variable type within the class list derived from step 1506 above. The process is repeated until there are no more classes to search. Subsequently, the process 1500 proceeds to step 1516.

At step 1516, the process 1500 retrieves a class to search from class data structure 500. At step 1518, the process 1500 determines if there are accessible class variables within the current class list matching the selected variable type. If there are no class variables matching the selected variable type then the process 1500 proceeds to step 1514 to process the next class. If there are variables matching the selected variable type within the class being searched, the method 1500 proceeds to step 1520 and adds the matching external variables to the internal variable data structure 400 to form a combined internal/external data structure 600. Subsequently, the process 1500 proceeds to step 1514. In one aspect, if all of the variable types have been processed at step 1508, then the process 1500 proceeds to step 1510 to order the internal and/or external variables as described below with respect to FIG. 17.

Figure 16:
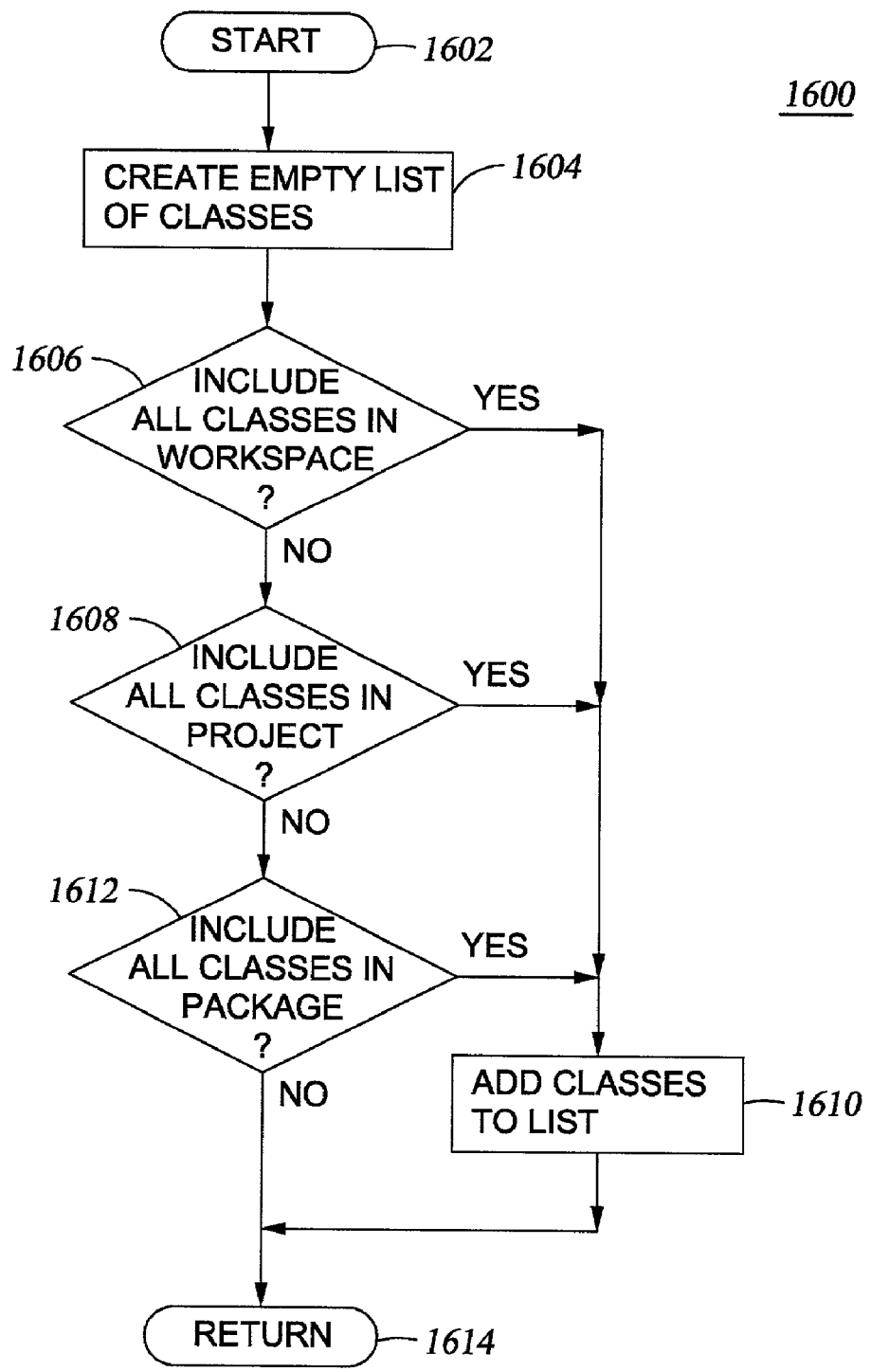
FIG. 16 is a flow diagram of a method of generating a list of classes to search for external variables.

FIG. 16 depicts one embodiment for a flow diagram of a process 1600 of the programming assistance tool 130 for generating the list of external classes to search for external variables. The process 1600 is embodied as step 1506 described above with reference to FIG. 15. The process 1600 starts at step 1602 when process 1600 is entered at step 1506. In one aspect, at step 1604, the process 1600 receives a selection for the range of classes to use. For example, the user may want to include classes within the local workspace, classes in a project, and/or classes in a package to increase the number of variable choices. At step 1606, the process 1600 determines if the user has selected classes within a local workspace such as all classes within the IDE 110. If the user has selected to search classes within the local workspace then process 1600 proceeds to step 1610 to find and add the classes to search to classes data structure 500. If the user has not selected to search classes within the IDE 110, then process 1600 proceeds to step 1608.

At step 1608, the process 1600 determines if the user has selected classes within a project. If the user has selected to search classes within the project, then process 1600 proceeds to step 1610 to search for and add the classes within the project to the class data structure 500. If the user has not selected to search classes within the project, then process 1600 proceeds to step 1612.

At step 1612, the process 1600 determines if the user has selected to search the classes defined within a package. If the user has selected to search classes within the package, then process 1600 proceeds to step 1610 to add the classes within the project to search to class data structure 600. If the user has not selected to search classes within the package, then process 1600 proceeds to step 1614 and returns to process 1500.

Figure 17A:
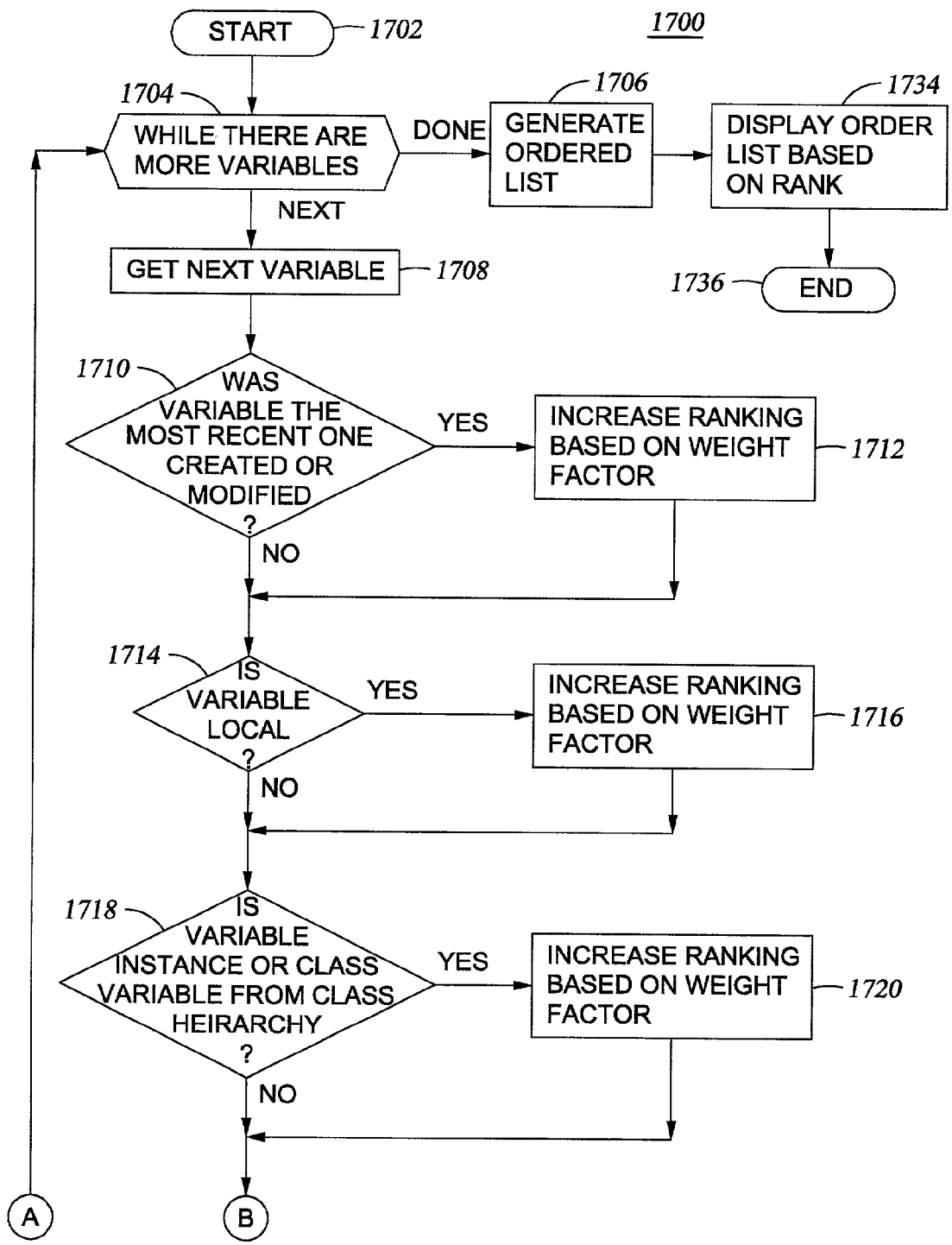
FIGS. 17A and 17B are a flow diagram of a method of ranking internal and/or external variables.
Figure 17B:
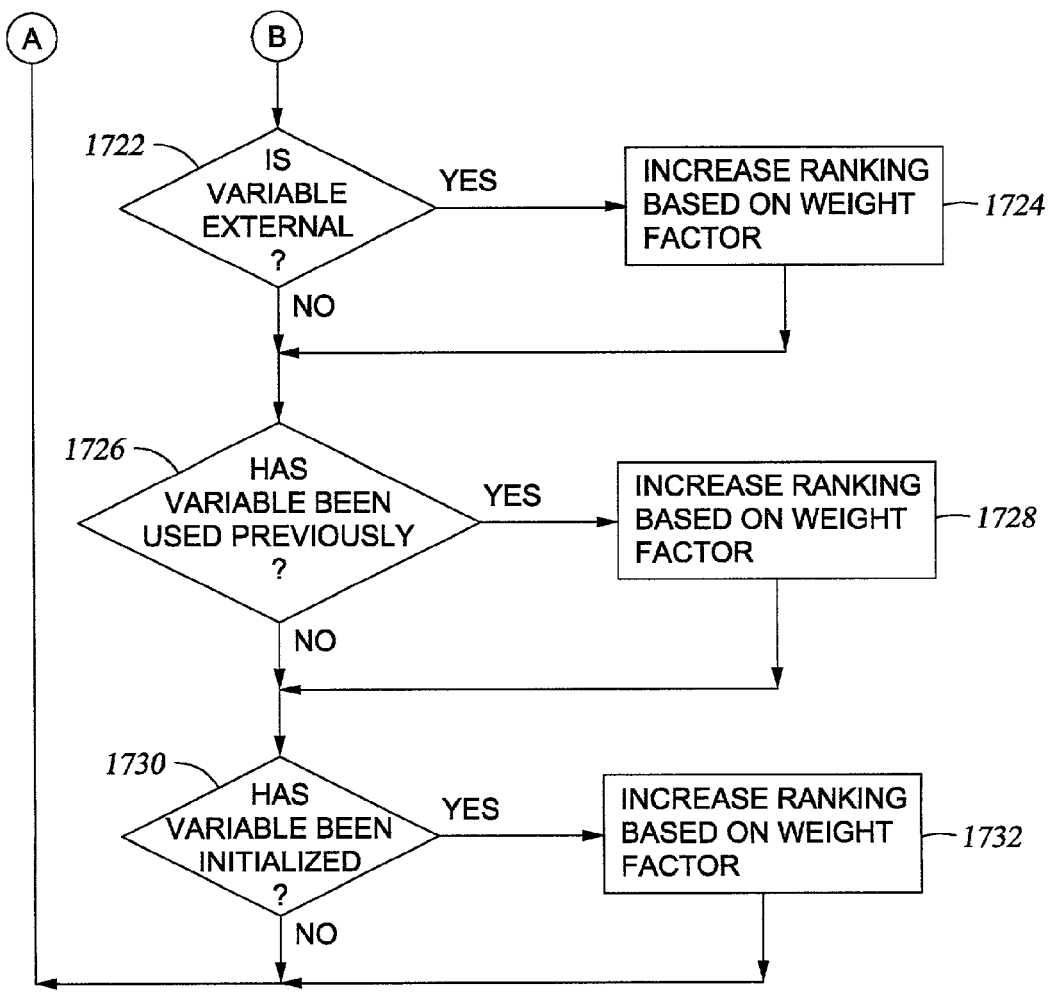

FIGS. 17A and 17B depict one embodiment for a flow diagram of a process 1700 of the programming assistance tool 130 for ranking internal and/or external variables within the internal/external variable data structure 700. The process 1700 is embodied as step 1510 described above with reference to FIG. 15. The process 1700 starts at step 1702 when process 1700 is entered at step 1510. At step 1704, the process 1700 receives the list of variables from internal/external data structure 600. At step 1708, the process 1700 retrieves a variable from the internal/external data structure 600. At step 1710, the process 1700 determines if the variable is the most recently created and/or modified. If the variable is the most recently created and/or modified then the process 1700 proceeds to step 1712. At step 1712, the process 1700 retrieves the weighting factors from the weighting data structure 700 with respect to the attributes for the most recently created and/or modified variables. For example, the most recently created and/or modified variables have a weight of "+30". If the variable is not a variable that has been most recently created and/or modified, then the process 1700 proceeds to step 1714.

At step 1714, the process 1700 determines if the variable is a local variable (i.e., within the accessible workspace). If the variable is a local variable, then the process 1700 proceeds to step 1716 and increases the ranking weight by the weighting factor derived from the weighting data structure 700. If the variable is not a local variable, then the process 1700 proceeds to step 1718.

At step 1718, the process 1700 determines if the variable is a variable instance or class variable. If the variable is a variable instance or class variable then the process 1700 proceeds to step 1720 and increases the ranking weight by the weighting factor derived from the weighting data structure 700. If the variable is not a variable instance or class variable, then the process 1700 proceeds to step 1722.

At step 1722, the process 1700 determines if the variable is external. If the variable is external, then the process 1700 proceeds to step 1724 and increases the ranking weight by the weighting factor derived from the weighting data structure 700. If the variable is not external, then the process 1700 proceeds to step 1726.

At step 1726, the process 1700 determines if the variable has been used recently. If the variable has been used recently, then the process 1700 proceeds to step 1728 and increases the ranking weight by the weighting factor derived from the weighting data structure 700. If the variable has not been used recently, then the process 1700 proceeds to step 1730.

At step 1730, the process 1700 determines if the variable has been initialized. If the variable has been initialized, then the process 1700 proceeds to step 1732 and increases the ranking weight by the weighting factor derived from the weighting data structure 700. If the variable has not been initialized, then the process 1700 proceeds to step 1704 to add the variable and associated weighting factor to the sorted variable data structure 900.

In one embodiment, the process 1700 sums the weighting factors associated with the selected variable to determine an overall weighting factor for each variable. The over all weighting factor and the associated variables are stored within the ranked variable data structure 800.

In one aspect, if all of the variables have been processed at step 1704, then the process 1700 proceeds to step 1706. At step 1706, the process 1700 determines the percentage ranking based on the weighting factor by using weighting factors such as those found within the ranked variable data structure 800 and proceeds to step 1734. At step 1734, the results of the ranking from the sorted variable data structure 900 are displayed via the output device 128.

Although various embodiments which incorporate the teachings of the invention have been shown and described in detail herein, those skilled in the art can readily devise many other varied embodiments within the scope of the invention. For example, the user could add new entries into the variable list prior to defining the variable (e.g., New String ( ). Likewise, in another embodiment, the user can add methods to the method data structure 300 where the new methods are defined to return the same variable type as the current external and/or internal variables and would therefore be displayed along with the other variables during the prompt. For example, the method "methodCallA(methodCallB( ))" where "methodCallB( )" would be displayed along with the other variables associated with "methodCallA( )".

While in one embodiment ranking is based on a set of weighting factors for each variable attribute, the ranking may be modified to accommodate different programming scenarios. For example, the programming assistance tool 130 determines if the variables have been used for their intended purpose, and if so, places them at a lower ranking e.g., if a variable were already used for its intended purpose, the programming assistance tool 130 would then set the variable weighting to zero. In another example, the programmers past habits can be taken into account. For example, if the programmer consistently chooses a variable, the programming assistance tool 130 modifies the weighting factor to increase the variable's rank. In another example, other calls to the same method in a procedure are analyzed by the programming assistance tool 130 to determine if one of the parameters is always being passed in. Additionally, if the same procedure is being called and one the parameters is being incrementally added to, the programming assistance tool 130 would set the next increment as the most likely choice.

In another embodiment, the programming assistance tool 130 could be used to sort and list the methods from the method data structure 200 to facilitate the user in finding the most likely method to use. For example, the programming assistance tool 130 could be used to order the methods by usage, which can be broken down, by class, package, or project, and combinations thereof. Additionally, the method usage can be defined in terms of a team of programmers usage of a particular method.

While the foregoing is directed to the preferred embodiment of the invention, other and further embodiments of the invention may be devised without departing from the basic scope thereof, and the scope thereof is determined by the claims that follow.

What is claimed is:

1. A method of providing programming assistance for an integrated development environment, comprising:
   receiving a selection of a method call from a list of method calls;
   determining one or more variables types by searching at least one data structure for one or more variable types passed as arguments to the method call, storing the one or more variable types,
   determining a list of variables, of the one or more variable types; and
   providing a list of variable, sorted according to a hierarchical order, that are available to be passed to the method call.

2. The method of claim 1, further comprising:
   receiving a selection of a variable from the list of variables; and
   modifying source code displayed on an output device according to the selection of the method call and the selection of the variable.

3. The method of claim 1, further comprising searching the at least one data structure for one or more internal variables comprising an internal variable type and comparing each of the internal variable types to the one or more variable types wherein, if the internal variable type matches one of the variable types, then storing the internal variables.

4. The method of claim 1, further comprising searching the at least one data structure for one or more external variables comprising an external variable type and comparing each of the external variable types to the one or more variable types wherein, if the external variable type matches one of the variable types, then storing the external variables.

5. The method of claim 1, wherein sorting the variables in hierarchical order comprises weighting the variables and listing the variables according to the weights.

6. The method of claim 5, wherein weighting the variables comprises associating each variable with a weighting factor based on attributes comprising a most recently modified variable attribute, a most recently created variable attribute, a local variable attribute, class attribute, external attribute, usage attribute, initialized attribute, and combinations thereof.

7. The method of claim 6, wherein associating each variable with a weighting factor based on attributes comprises summing the weighting factors for each variable and ranking the variables based upon a summation value.

8. A computer-readable medium comprising a programming assistance tool, wherein the programming assistance tool, when executed by a processor performs an operation comprising:
    upon receiving a selection of a method call from a list of method calls for a source code document,
    determining one or more variables types by searching at least one data structure for one or more variable types passed as arguments to the method call, storing the one or more variable types;
    determining a list of variables, of the one or more variable types; and
    generating, for display, a list of variables, sorted according to a hierarchical order, that are available to be passed to the method call, wherein the selection of the method call and a selection of a variable from the list of variables are to be input to the source code document.

9. The computer-readable medium of claim 8, further comprising searching the at least one data structure for one or more internal variables comprising an internal variable type and comparing each of the internal variable types to the one or more variable types wherein, if the internal variable type matches one of the variable types, then storing the internal variables.

10. The computer-readable medium of claim 8, further comprising searching the at least one data structure for one or more external variables comprising an external variable type and comparing each of the external variable types to the one or more variable types wherein, if the external variable type matches one of the variable types, then storing the external variables.

11. The computer-readable medium of claim 8, wherein listing the variables in hierarchical order comprises weighting the variables, and listing the variables according to the weights.

12. The computer-readable medium of claim 11, wherein weighting the variables comprises associating each variable with a weighting factor based on attributes comprising a most recently modified variable attribute, a most recently created variable attribute, a local variable attribute, class attribute, external attribute, usage attribute, initialized attribute, and combinations thereof.

13. The computer-readable medium of claim 12, wherein associating each variable with a weighting factor based on attributes comprises summing the weighting factors for each variable and ranking the variables based upon a summation value.

14. A processing system, comprising:
    a memory comprising:
        a source code document;
        a programming assistance tool to modify the source code document;
        a method call list configurable with a list of method calls; and
        a variables list configurable with a list of variables available to pass to at least one method call from the list of method calls; and
    a processor which, when executing the programming assistance tool, is configured to perform an operation comprising:
        receive a selection of a method call from the list of method calls;
        prepare, for display, the list of variables associated with and available to be passed to the method call;
        sort the list of variables in a hierarchical order;
        receive a selection of a variable from the list of variables; and
        modify the source code document according to the selection of the method call and the selection of the variable.

15. The processing system of claim 14, wherein the processor is further configured to sort the list of method calls into a hierarchy based on at least one of usage, alphabetical order, accessibility, and combinations thereof.

16. The processing system of claim 14, wherein processor is configured to sort the variables in the hierarchical order by weighting the variables.

17. The processing system of claim 16, wherein weighting the variables comprises associating each variable with a weighting factor based on attributes comprising a most recently modified variable attribute, a most recently created variable attribute, a local variable attribute, class attribute, external attribute, usage attribute, initialized attribute, and combinations thereof.

18. The processing system of claim 17, wherein associating each variable with a weighting factor based on attributes comprises summing the weighting factors for each variable and ranking the variables based upon a summation value.

* * * * *